United States Patent

Hull et al.

[11] Patent Number: 5,210,895
[45] Date of Patent: May 18, 1993

[54] COMBINED SCREWDRIVER AND FILE

[76] Inventors: Harold L. Hull, 401 Canyon Way #43, Sparks, Nev. 89434; Dominic A. Letizia, 719 Pat La., Carson City, Nev. 89701

[21] Appl. No.: 844,164

[22] Filed: Mar. 2, 1992

[51] Int. Cl.[5] .................................................. B25F 1/00
[52] U.S. Cl. ........................................... 7/165; 7/901
[58] Field of Search ......................... 7/165, 901, 170; 81/436, 437, 439; 29/78, 80

[56] References Cited

U.S. PATENT DOCUMENTS

| | | | |
|---|---|---|---|
| 196,354 | 10/1877 | Harris | 7/165 |
| 299,488 | 5/1884 | Morrell | 7/165 |
| 869,706 | 10/1907 | Hamilton | 7/165 |
| 3,452,373 | 7/1969 | Vosbikian et al. | 7/1 |
| 3,842,875 | 10/1974 | Tascone | 145/50 C |
| 3,891,017 | 6/1975 | Iskra | 145/50 A |
| 3,950,832 | 4/1976 | Blane | 29/78 |
| 4,092,753 | 6/1978 | Fuhrmann | 7/158 |
| 4,155,149 | 5/1979 | Claesson | 29/78 |
| 4,212,336 | 7/1980 | Smith | 81/436 |
| 4,320,544 | 3/1982 | Bryant et al. | 7/158 |
| 4,325,168 | 4/1982 | Swentzel | 29/78 |
| 4,437,365 | 3/1984 | Yaari | 81/436 |
| 4,584,745 | 4/1986 | Seiber | 29/78 |
| 4,590,651 | 5/1986 | Roberts | 29/80 |
| 4,631,770 | 12/1986 | Goldberg | 7/167 |

FOREIGN PATENT DOCUMENTS 0909320 12/1945 France ................................. 7/165

*Primary Examiner*—Roscoe V. Parker

[57] ABSTRACT

A combination screwdriver and file including a handle, with the screwdriver and file being in various combinations such as a slot screwdriver with the shank being a round file or a phillips screwdriver with the shank being a three-cornered file. In a second embodiment the handle supports other releaseably held bits in a cavity which may be magnetic.

2 Claims, 1 Drawing Sheet

COMBINED SCREWDRIVER AND FILE

FIELD OF THE INVENTION

This invention relates to combination tools and more particularly to a combination of an elongated file with a screwdriver at its tip.

BACKGROUND OF THE INVENTION

In the past a number of combination tools including a screwdriver have been proposed such as the combination of a drill and screwdriver of U.S. Pat. No. 4,092,753 or the combination drill and screwdriver of U.S. Pat. No. 4,320,544 or the combined screwdriver and socket wrench of U.S. Pat. No. 3,452,373, however, to the knowledge of the inventors the disclosure of a combination file and screwdriver has not been taught.

SUMMARY OF THE INVENTION

The work place today requires a mechanic to possess a great variety of tools especially screwdrivers which have a variety of tips and a variety of files with different shapes such as flat files, round, three-cornered, etc., and it becomes cumbersome to have so many tools in his inventory that require maintenance and storage and whenever practical it is advantageous to incorporate more than one function in a tool, such as the combination screwdriver and file of the present invention.

It is therefore a primary object to provide a combination screwdriver and file.

It is a further object to provide a screwdriver and file combination including a suitable handle.

Another object is to provide the combination of a file and screwdriver in a variety of combinations such as a round file and a phillips screwdriver head or a slot screwdriver with a three-cornered file.

Still another object is to provide in the handle a tip holder for mounting various fastener tips such as multiple phillips sizes and multiple straight slot screwdriver tips etc.

Yet another object is to make the tip holder magnetic.

Other objects and advantages will become obvious when taken into consideration with the following drawings and specifications.

DETAILED DESCRIPTION OF THE DRAWINGS

Figure 1:
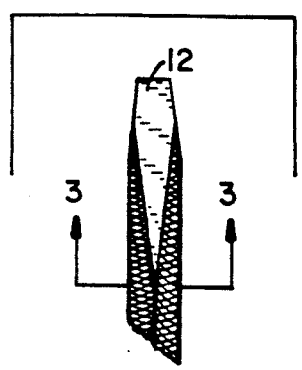
FIG. 1 is a broken side view of a three-corner file with a slotted screwdriver head on one of its ends and includes a handle.
Figure 2:
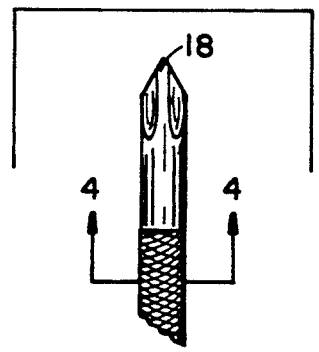
FIG. 2 is a broken side view of a round file with a phillips screwdriver head on one of its ends and includes a handle.
Figure 3:
FIG. 3 is a section taken at 3—3 of FIG. 1.
Figure 4:
FIG. 4 is a section taken at 4—4 of FIG. 2.
Figure 4:
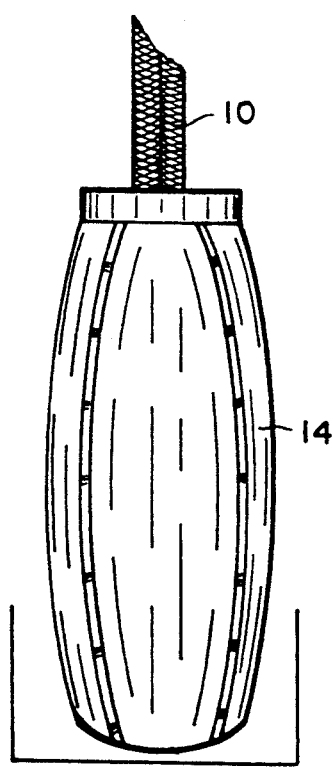

In FIG. 1, 10 is a three-cornered file with 12 being a slotted screwdriver tip while 14 is a handle suitably mounted on the distal end of three-cornered file 10, while in FIG. 2, 16 is a round file with 18 being a phillips screwdriver tip and 20 being a handle suitably mounted to the distal end of round file 16.

Figure 5:
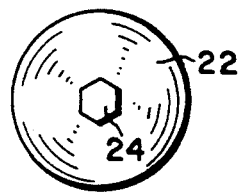
FIG. 5 is an end view shoving a tip holder in the handle.
Figure 6:
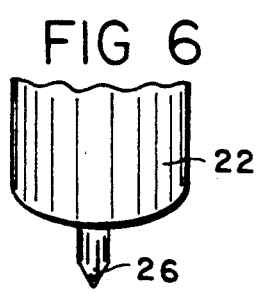
FIG. 6 is a partial side view of a handle including a tip.
Figure 6:
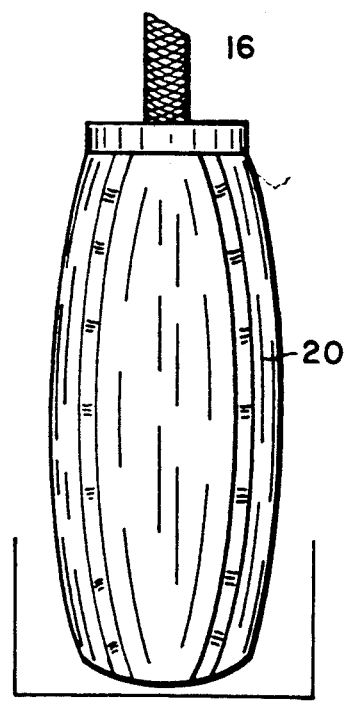

FIG. 5 shows a second embodiment which includes a handle 22, and a hex shaped cavity 24, to accept multiple tips depicted by typical tip 26.

It will now be seen that we have provide a combination tool which in one tool combines a file and a screwdriver in various arrangements thus eliminating the need to carry various screwdrivers and files.

We have also provided a handle which serves as a handle or griping surface for both the screwdriver and the file.

It will also be noted that in a second embodiment we have provided in the handle a hex shaped cavity to accept various tips such as slotted or phillips screwdriver tips.

It is also to be understood that the cavity may be made magnetic to releasably hold and capture the various tips.

Although the invention has been shown and described in what is conceived to be the most practical and preferred embodiment, it is recognized that departures may be make therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is;

1. A combination screwdriver and file comprising; a handle, said handle having first and second ends, multiple removable shanks carried by said first end of said handle, said multiple removable shanks being configured on their free ends for mating insertion into a cavity in the head of a threaded fastener, said multiple removable shanks being configured on their handle mating ends for mating insertion into said first end of said handle, said multiple removable shanks being configured on their outer surfaces by a multiplicity of single cut teeth forming files of various shapes and sizes, said second end of said handle having a cavity, multiple bits, said cavity cooperating with said bits to releaseably hold said bits in a working relationship with said handle, whereby, said multiple removable shanks, said configurations on said free end of said shanks, said configurations on the outer surfaces of said shanks forming files of various sizes and shapes and said multiple bits, cooperate together to form a tool with multiple combinations of files, screwdrivers and bits.

2. The combination screwdriver and file of claim 1 in which said cavity is magnetic.

* * * * *